United States Patent [19]
Desvignes

[11] 3,936,629
[45] Feb. 3, 1976

[54] HORIZON SENSOR FOR A SATELLITE IN GEOSTATIONARY ORBIT

[75] Inventor: Francois Desvignes, Bourge-la-Reine, France

[73] Assignee: U.S. Philips Corporation, New York, N.Y.

[22] Filed: Oct. 7, 1974

[21] Appl. No.: 512,893

[52] U.S. Cl.............. 250/209; 250/202; 250/203 R; 250/234; 250/347
[51] Int. Cl.² ............................................. G01J 1/04
[58] Field of Search........ 250/203 R, 202, 209, 234, 250/578, 347, 351, 353, 338; 356/141

[56] References Cited
UNITED STATES PATENTS

| | | |
|---|---|---|
| 3,237,010 | 2/1966 | Elliott et al. .......................... 250/347 |
| 3,732,424 | 5/1973 | Wojtulewicz ........................ 250/203 |
| 3,793,518 | 2/1974 | Harper ................................ 250/347 |

*Primary Examiner*—Eli Lieberman
*Assistant Examiner*—E. R. LaRoche
*Attorney, Agent, or Firm*—Frank R. Trifari; George B. Berka

[57] ABSTRACT

A horizon sensor for satellites comprising a mask with four sets of four openings one of which receives a projected portion of the earth-space transition line, another is in the form of a grating and the remaining two slit-shaped openings include each a detector on which a secondary image of the grating or of the transition are reflected by an oscillating concave spherical mirror to derive therefrom a digitized measuring signal indicating the position of the transition line.

7 Claims, 8 Drawing Figures

HORIZON SENSOR FOR A SATELLITE IN GEOSTATIONARY ORBIT

The present invention relates to a horizon sensor for a satellite in a geostationary orbit, which sensor includes an optical device for forming on a mask the image of the earth and of the surrounding space and means for evaluating any orbital deviation of the horizon sensor relative to earth by detecting - during an angular scanning movement - the earth-space transition of the image formed, and by evaluating in digital form the postion of the said transition within the range of the scanning angle.

It is an object of the present invention to provide a horizon sensor which provides measuring data directly in digital form and the accuracy of which is not affected by thermal stresses produced in the sensor and is independent of any deviation of the sighting axis relative to earth. The horizon sensor is of the type in which the image of the earth is scanned; by means of mechanical scanning means. Another object of the invention is to ensure negligible wear of these scanning means.

A horizon sensor according to the invention is characterised by:

first means to cause a first part of the image, which part includes an earth-space transition in the north-south direction of the image produced at zero orbital deviation, to oscillate in the north-south direction and to cause a second part of the image, which part includes an earth-space transition in the easr-west direction of the image produced at zero orbital deviation, to oscillate in the east-west direction, second means to detect, for each of the two oscillated parts of the image, the passage of the earth-space transition through the position in which the earth space transition of the image is normally formed if this image is motionless and the orbital deviation is zero, third means to form an image of a part of the projected space along the said north-south and east-west axes, and to divide the said image into space elements, by means of an oscillating image of gratings and fourth means to determine the number of the space elements relative to the position of the earth-space transition detected by the second means.

An embodiment of the invention will now be described, by way of example, with reference to the accompanying diagrammatic drawings, in which.

Figure 3:
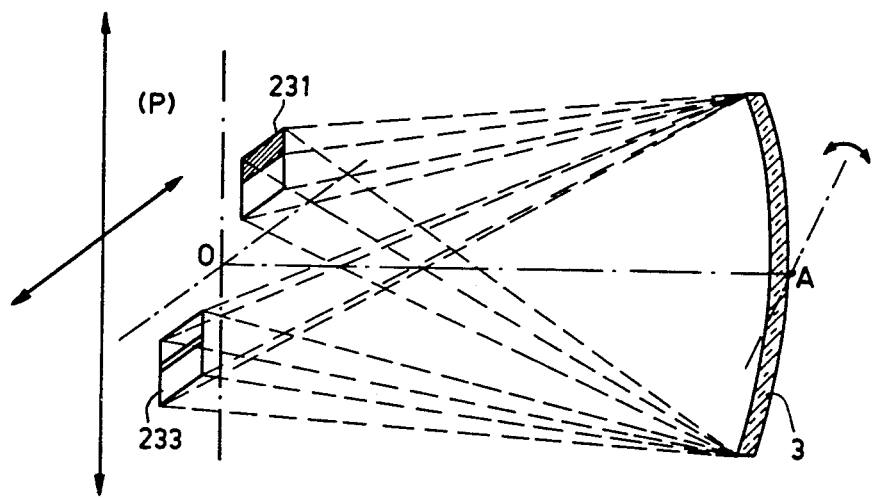
Figure 4:
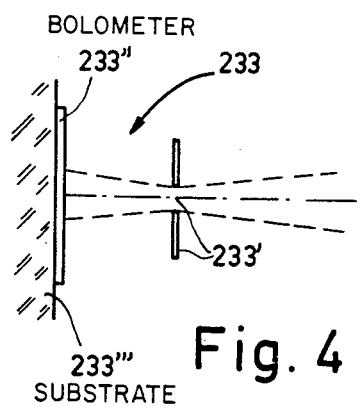
Figure 5A:
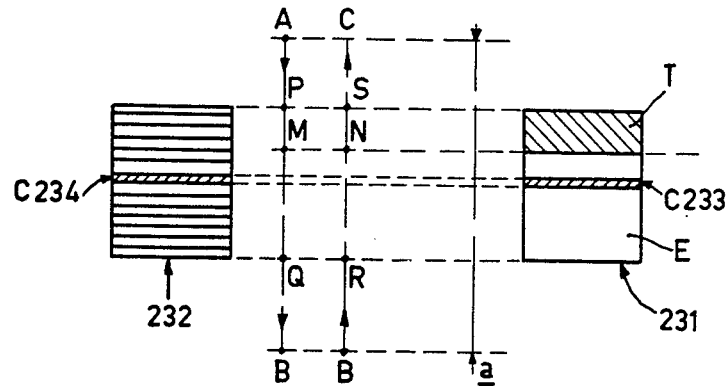
Figure 5B:
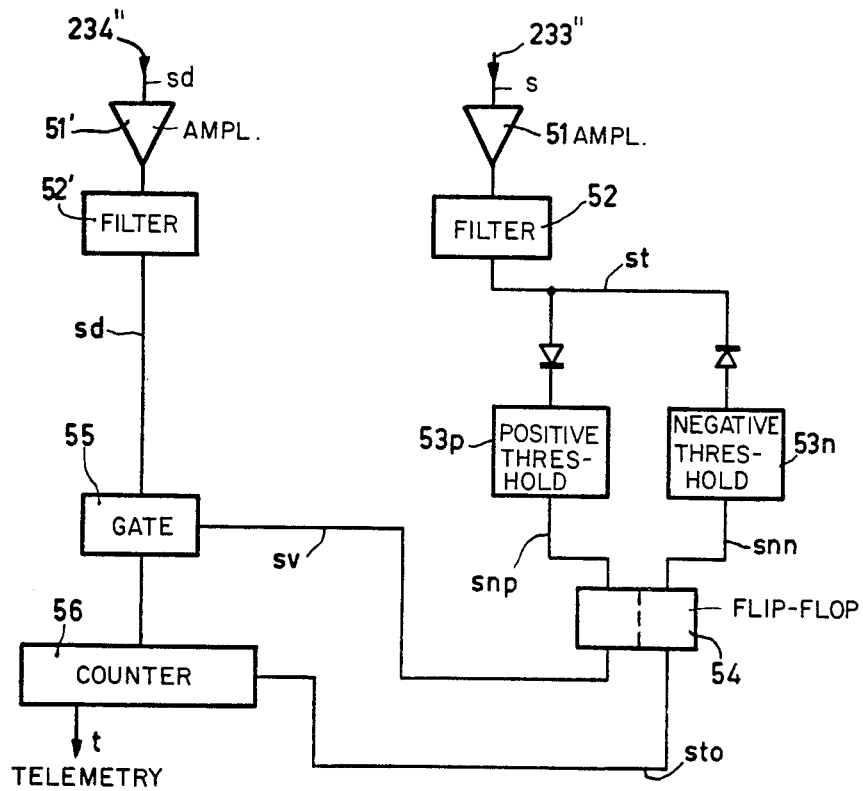
Figure 6:
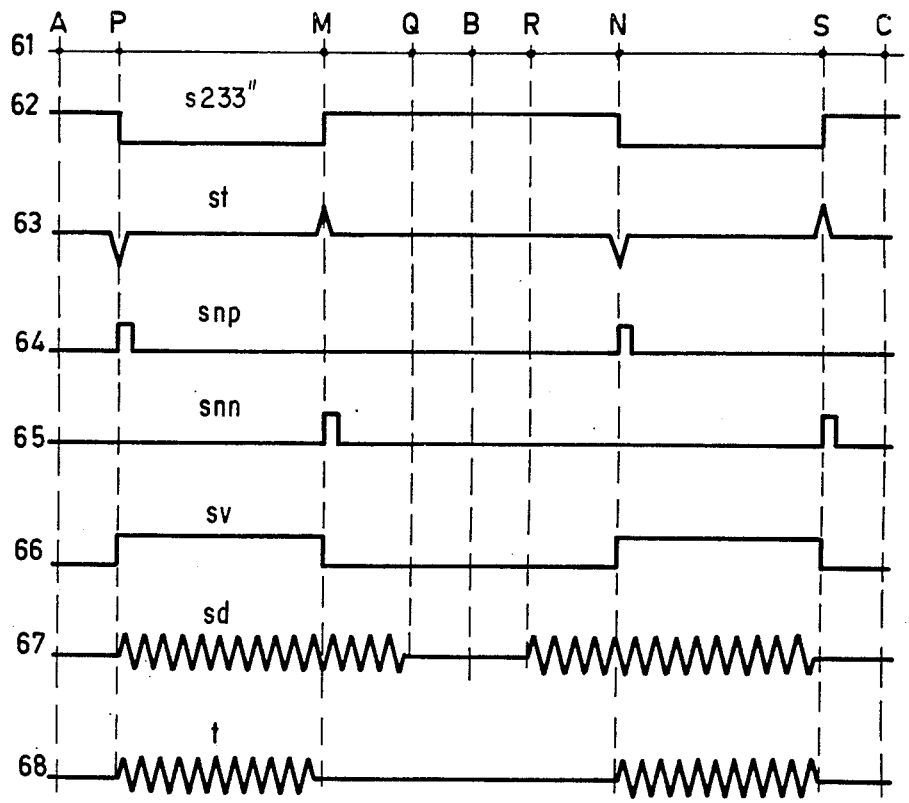

FIG. 3 illustrates the basic scanning mechanism of a horizon sensor according to the invention, FIG. 4 shows on an enlarged scale, the arrangement of a radiation detector combined primary and secondary images FIG. 5a illustrates and indicates their scanning movement, FIG. 5b shows schematically the electronic circuit for processing and counting pulses from the radiation detectors; and FIG. 6 shows the electric signals at various points in this circuit.

Figure 1A:
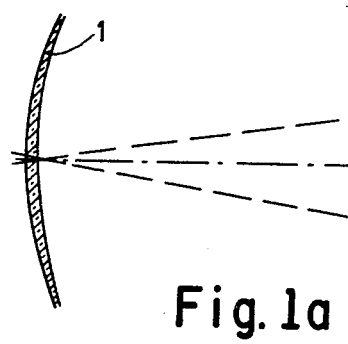
FIG. 1a shows schematically the optical projection part of an embodiment of the invention.
Figure 1B:
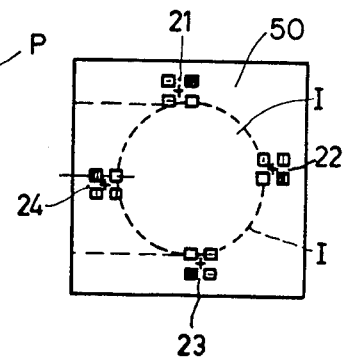
FIG. 1b is a plan view of a mask with four sets of four apertures.

Referring now to FIG. 1a an objective 1 forms an image I of the earth in a plane P of the sensor. FIG. 1b is a plan view, of a projection mask 50 located in the plane P.

Figure 2:
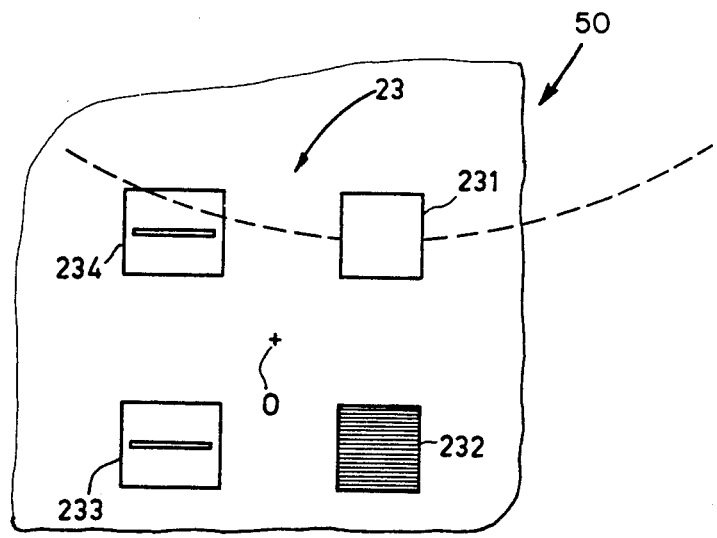
FIG. 2 shows a part of FIG. 1 on an enlarged scale.

Four systems 21, 22, 23 and 24 are provided in the plate or mask 50. The elements of the systems are disposed in or on a plate or mask which may be secured in a frame. The four systems are identical. FIG. 2 shows one of the systems (the system 23) on an enlarged scale. The system comprises:

a first opening 231 which defines a part of the earth-space transition of the image I and is situated on the north-south axis of the image formed at zero orbital deviation. The corresponding opening of the system 21 is also situated on the said north-south axis. The corresponding openings of the systems 22 and 24 are situated on the east-west axis of the image I formed at zero deviation;

a second opening 232 which defines a part of the image of space and is situated on the same axis as the first opening of the same system and is in the form of a grating the lines of which are at right angles to the said axis;

two identical structures 233 and 234 one of which is illustrated in a sectional view on an enlarged scale in FIG. 4 as shown in FIG. 4, structure 233 comprises a slit 233′ and a bolometer 233″ on a substrate 233′″. Both structures 233 and 234 are centered about a first axis parallel to the axis about which the opening 231 and 232 are centered and also about two further axes at right angles to the said first axis. For the structure 234 the further axis is that about which the opening 231 is centered, and for the structure 233 the further axis is that about which the opening 232 is centered.

The center of the system 23 comprising the elements 231, 232, 233 and 234 is designated by 0;

FIG. 3 shows in a perspective view apertures 231 and 233 located the plane P. The coordinate axes of the plane are denoted by double-headed arrows. The opening 231, the structure 233 and the center 0 of the system 23 are situated in the plane P. Each system, similarly as the system 23 in FIG. 3, is associated with a spherical concave mirror 3 the centre of curvature of which is situated at 0 in the plane P. The mirror 3 forms a secondary image of magnification −1 and of excellent optical quality of the apertures 231 and 233 in the plane P, the secondary image being symmetrical about the point 0. The broken lines in FIG. 3 show the path of the transmitted and reflected light rays. The structure 233 is situated in the plane P so that its slit is optically associated with the reflected secondary image of earth-space transition at zero orbital deviation. The mutual arrangement of the opening 231 and the structure 233 also applies to the opening 232 and the structure 234 located on the other diagonal between the coordinate axes. A horizon sensor according to the invention comprises three further sperical concave mirrors, one for each of the systems 21, 22 and 24.

Each mirror is caused to oscillate about an axis A(-FIG. 3) at right angles to the optical axis and to the north-south or east-west reference axis of the system of which the relevant mirror forms part. During the oscillatory movement (for the system 23):

the bolometer 233″ of the structure 233 will deliver a pulse when the secondary image formed by the mirror 3 of the primary image of the earth-space transition passes through the slit of the said structure, the bolometer of the structure 234 will alternately be struck, through the slit preceding it, by radiation from the rules of the grating 232 and by radiation from space which passes through the objective and the unruled parts of the grating; hence this bolometer delivers a sawtooth signal the frequency of which is a function of the oscillation frequency of the mirror and of the number of ruling of the grating.

Thus the described arrangement enables the definition of a scanning angle the value of which is a function of the amplitude of the oscillating motion imparted to the mirrors and further enables, at the level of each of the two earth-space transitions situated on the north-south and east-west axes, the direct digitization of respective scanning positions according to a scale which depends upon the number of rulings of the gratings associated with the openings which transmit the radiation from space. The position of the earth-space transition of the image formed by the objective can be digitally determined within the scanning angle. The electric signals delivered by the bolometers of the structures 233 and 234 can be processed by means of a circuit as shown in FIG. 5b.

In the discussion of the operation of the circuit of FIG. 5b reference will be made to FIG. 5a. FIG. 5a shows images in openings 232 and 231 forming optically conjugates C 234 and C 233 with images of the detectors 234 and 233, the amplitude $a$ of the scanning angle due to the motion of the mirror, the various parts of the outgoing and return trajectory A—P—M—Q—B—R—N—S—C, the image T of the earth and the image E of space.

FIG. 6 is a voltage wave diagram of the signals at various points in the circuit of FIG. 5b during a full scanning cycle. Various reference letters of the trajectory of FIG. 5a are shown along a line 61.

A signal $s$ 233 (line 62 of FIG. 6) from the detector 233 and a signal $s$ 234, from the detector 234 are each applied to an amplifier 51 and 51' respectively as illustrated in FIG. 5b. The amplifiers are followed by filters 52 and 52' respectively for producing two trains of positive and negative pulses, namely a transition signal $st$ (line 63 of FIG. 6) and a digitizing signal $st$ (line 67 of FIG. 6).

The scanning amplitude $a$ due to the motion of the mirror is such that the image C 233 of the detector 233 formed by this mirror periodically falls outside the opening 231. As a result, positive or negative pulses are produced not only by the earth-space transition at points M and N respectively, but also by the transitions from the plate 50 to space and vice versa, in other words by the edges of the opening 231 (at points P and S).

The signal $st$ is applied to two threshold circuits, a positive-threshold circuit 53p and a negative-threshold circuit 53n, which deliver standardized signals $snp$ (line 65 of FIG. 6) and $snn$ (line 64 of FIG. 6) respectively. The standardized signals control a bistable flip-flop circuit 54, the output signal $sv$ from which comprises the square-wave enabling pulses (line 66 in FIG. 6).

The digitizing signal $sd$ is applied to the input of a gate 55 by which it is transmitted to a counter 56 which is connected to a tellemetering device $t$, not shown under the control of the flip-flop circuit 54.

A signal $sv$ ensures that the gate 55 allows the signal $sd$ between the points P—M and N—S to pass to the counter 56. The output signal $sto$ from the flip-flop circuit causes the counter 56 to be reset and its contents to be transferred to the telemetering device. Thus a twofold counting operation is performed (line 68 of FIG. 6) to reduce measuring errors:

a first between the plate-space transition and the space-earth transition (between points P and M), a second count between the earth-space transition and the space-plate transition (between points N and S).

The number of pulses counted is proportional to the distances defined by the said points so that the position of the earth-space transition in the opening 231 is digitized.

In a practical embodiment of a horizon sensor according to the invention the objective 1 is a germanium objective having an effective diameter of 50 mm and a focal length of 80 mm. The image of the earth (apparent diameter 17.3°) formed by the objective has a diameter of 24 mm. The rear face of the objective is provided with an assembly of interference layers by which radiation of wavelengths of less than 13$\mu$m is reflected and radiation of greater wavelengths is transmitted. Because germanium absorbs radiation of wavelengths greater than 22$\mu$m, only radiation having wavelengths between 13 and 22$\mu$m is transmitted by the objective.

The four spherical concave mirrors (which are coated with gold) each have a radius of curvature of 32 mm and a diameter of 24mm.

The dimension of the openings in the plate are 1.4 by 1.4 mm. The gratings, such as the grating in the opening 232, each have 30 unruled parts and a pitch of 46$\mu$m. The spacing between the axes of the two openings (such as 231 and 232) of a system is 3.5 mm.

The structures, such as 234 and 233, each comprise a bolometer of size 0.3 by 1.7 mm. The slit preceding the bolometer is spaced from it by 0.20 mm. The length and width of the slit are 1.4 mm and 23$\mu$m respectively. The spacing between the axis common to the two openings and the axis common to the two slits is 3.5 mm. This spacing is a function of the radius of curvature and the orientation of the principle axis of the mirrors. The four mirrors each are mounted on a flexible spindle (the long-term reliability of which is well known) and is caused to oscillate at a frequency of the order of 2Hz with an amplitude of the order of 0.9°, which results in scanning over about 2 mm. It should be mentioned that in this case the centre 0 of a mirror lies on an axis which is parallel to the tangent to the earth-space transition at zero orbital deviation (motionless image), the spacing between the centre 0 and this transition being 1.375mm, which consequently exceeds the distance which corresponds to one half of the scanning angle which is defined by the amplitude of oscillation of the mirror. This is necessary to enable the grating associated with the openings such as 232 always to "see" space.

In the device having the above characteristics the bolometer of each structure as 234 thus is a "count detector" which receives an infrared signal comprising symmetrical sawteeth and having 30 peaks per half-period. The bolometer of each structure such as 233 is a "transition detector" which receives an infrared signal the level of which changes each time the secondary image of the earth-space transition passes through the slit preceding this "transition detector".

In theory a horizon sensor according to the invention may comprise only two systems such as 21 and 22 or 23 and 24, and hence only two mirrors. In principle the same results may then be obtained. However, the results may be disturbed, for example by the position of the sum at the measuring path. Hence it is of advantage to have four measuring paths. Instead of bolometers other detectors, such as for example pyroelectric detectors, may be used.

The apparatus described with reference to the drawing is only one possible embodiment of a horizon sensor according to the invention. The apparatus may be modified without departing from the scope of the invention.

What is claimed is:

1. A horizon sensor for a satellite in a geostationary orbit, comprising means to project the image of the earth-space transition in a first plane, a reference frame located in said first plane to define a portion of the projected earth-space transition image relative to a predetermined axis, reflecting means mounted behind said reference frame for reflecting said portion of the transition image and for performing an angular oscillatory movement within the range of a predetermined scanning angle in a second plane perpendicular to said first plane and aligned with said axis, grating means located in said first plane opposite said reflecting means to pass through radiation from the projected earth-space transition image, first and second radiation detecting means located in said first plane to receive, respectively, reflected secondary images from said frame and said grating means during the scanning movement of said reflecting means, and pulse counting means connected to the outputs of said first and second detecting means to indicate, the count of pulses derived from said grating means during a pulse derived from said transition image in said frame.

2. A horizon sensor according to claim 1 further comprising a mask located in said first plane, said mask defining at least two sets of four openings, one opening in each set being arranged at the intersection of the projected earth-space transition image at a zero orbital deviation, with a predetermined geometrical coordinate axis, to form said reference frame, a second opening provided with gratings, and symmetrically arranged about a center point with respect to said frame, and two slit-shaped openings each including a radiation detector, and an oscillating concave spherical mirror assigned to each set to form said reflecting means, whereby the optical axis of said mirrors passes through said center point.

3. Horizon sensor as claimed in claim 2, wherein said slit-shaped openings form two rectangular slits, the longitudinal direction of the slits being parallel to the tangent to the earth-space transition of that secondary image which is formed when the primary image is motionless and orbital deviation is zero, and said slit-shaped detectors are perpendicular to said rectangular slits.

4. Horizon sensor as claimed in claim 2, wherein said gratings comprise unruled portions which transmit radiation and ruled portions impermeable to radiation and are situated in the plane in which the image of the earth and of space is formed on the north-south axis and on the east-west axis respectively of the motionless image at zero orbital deviation and outside the said motionless image and spaced from the earth-space transition of the latter image by a distance which is at least equal to the distance which corresponds to one half of the scanning angle, the rulings of the said gratings being parallel to the said coordinate axes.

5. Horizon sensor as claimed in claim 2, wherein the centers of curvature of the said mirrors lie in the first plane on axes parallel to the north-south axis and to the east-west axis of the motionless image at zero orbital deviation and also on an axis situated outside the said motionless image and spaced from the eath-space transition of the latter image by a distance at least equal to the spacing which corresponds to one half of the scanning angle, the principal axes of the said mirrors being oriented so and their radii of curvature being such that the two secondary images formed by the mirrors of the image parts which include the earth-space transitions along the north-south axis and the east-west axis are situated in the first plane in which the primary image is formed, the primary image and the secondary image being symmetrical about the centers of curvature of the mirrors, and in that the spherical concave mirrors oscillate about axes at right angles to the north-south and east-west axes.

6. Horizon sensor as claimed in claim 2, wherein the detectors which lie in the plane in which the image of the gratings if formed, are provided with at least two rectangular slits inserted into the path of the radiation at a point preceding the detectors, the orientation and the dimensions of the slits being such that during the oscillating motion of the mirrors the images formed of the radiation-absorbing rulings of the gratings and the image of space, seen through the unruled portions of the grating, are alternately formed exactly on the said slits, and in that for each detector the said pulse counting means include a circuit for stopping the counting in response to a trailing edge of a pulse from transition image detector.

7. A horizon sensor according to claim 2 wherein said radiation detectors include bolometers, the output of which is connected to corresponding inputs of said pulse counting means.

* * * * *